United States Patent [19]

Takagi et al.

[11] Patent Number: 4,695,993
[45] Date of Patent: Sep. 22, 1987

[54] OPTICAL INFORMATION RECORDING AND REPRODUCING APPARATUS AND OPTICAL DISC

[75] Inventors: Yuuji Takagi; Isao Satoh, both of Neyagawa; Tatsuo Sugimura, Fukuoka, all of Japan

[73] Assignee: Matsushita Electric Industrial Co., Ltd., Osaka, Japan

[21] Appl. No.: 743,314

[22] Filed: Jun. 10, 1985

[30] Foreign Application Priority Data

Jun. 15, 1984 [JP] Japan .................................. 59-122999
Jun. 15, 1984 [JP] Japan .................................. 59-123005
Nov. 19, 1984 [JP] Japan .................................. 59-243665

[51] Int. Cl.$^4$ ........................ G11B 5/09; G11B 15/04
[52] U.S. Cl. ........................................ 369/54; 360/60
[58] Field of Search ............... 360/49, 53, 60; 369/48, 369/58, 54, 100, 32, 33

[56] References Cited

U.S. PATENT DOCUMENTS

4,571,716  2/1986  Szerlip .................................... 369/58
4,606,016  8/1986  Verboom et al. ....................... 369/58

*Primary Examiner*—Vincent P. Canney
*Attorney, Agent, or Firm*—Spencer & Frank

[57] ABSTRACT

An information recording and reproducing apparatus records and reproduces information in and from a recording medium including an information recording region divided into a plurality of sectors. In recording and reproducing information in and from the recording medium, each sector includes a sector address part formatted and a data recording part for recording data. A predetermined signal is overwritten in the address of a sector thereby making reproduction of the address impossible to prevent data from being recorded again by error in the sector containing data, while at the same time protecting the writing in the sectors. In data recording, on the other hand, the address signal from the recording medium is binary-coded at a different level to detect a sector of unstable address reproduction, so that a predetermined signal is overwritten in the address of this sector to make subsequent reproduction of the address impossible, thus permitting recording only in the sectors of stable address reproduction for stable data reproduction. Further, an optical disc having sectors of stable address reproduction alone detects a sector of unstable reproduction at the time of inspection, and overwrites a predetermined signal in the address part of the particular sector to make subsequent reproduction of the address impossible.

6 Claims, 6 Drawing Figures

OPTICAL INFORMATION RECORDING AND REPRODUCING APPARATUS AND OPTICAL DISC

BACKGROUND OF THE INVENTION

The present invention relates to an optical information recording and reproducing apparatus and an optical disc.

In an information recording and reproducing apparatus for recording and reproducing information on sectors of an optical disc, it is necessary to record information in each sector and reproduce it correctly from such sector. Further, the information recorded must be reproduced without fail. For this purpose, the conventional information recording and reproducing apparatuses confirm the sector address by an address part arranged ahead of the sectors or by counting a sector separation signal inserted between sectors to determine the sector address. Generally, however, the signal generating the sector address is so short in duration that an effective error control is impossible, necessitating a satisfactory guarantee of the reliabilty of the address part. As a corrective action, a system has been suggested (Japanese Patent Application No. 62438/83) in which an address is recorded in a data recording part which is generally more reliable than the sector address part so that when the sector of the address indicated in the directory is to be reproduced at the time of reproduction, the address recorded in the data recording part is referred to thereby preventing the loss of information. This system effectively prevents data from being lost by the non-identification of the sector address.

When the address part is reproduced and compared with the sector address to be recorded in the recording process, however, the address obtained by reproducing the address part of a recorded sector may make up an address of an unrecorded sector by error, in which case data may undesirably be written again in the recorded sector. In such case, the data of the sector thus overwritten is destroyed. In view of this problem of data destruction caused by overwriting or double writing, means of preventing such an overwriting is necessary to improve the data reliability.

With the increase in the recording capacity of the recording medium, on the other hand, a single recording medium tends to be jointly used by a multiplicity of users. Further, the complication of such a method of system operation requires a write protecting means capable of defending each user from other users in those cases where data may be lost by a system operation error, the need for such protection depending on the degree of importance of the data.

Furthermore, if the address part is not reproduced always correctly due to a flaw or drop-out of the recording medium, the address may not be reproduced correctly and may not be read correctly for the difference in environmental conditions or the like at the time of reproduction, although the address may have been reproduced and data recorded correctly in the data recording mode. For improving the data reading reliability, it is not proper to record data in such a sector, and it is necessary to avoid recording data in a sector from which the address cannot be always reproduced correctly.

SUMMARY OF THE INVENTION

The object of the present invention is to provide an information recording and reproducing apparatus comprising a recording medium including an information recording region divided into a plurality of sectors, each having an address part containing an address signal recorded therein and a data recording part for recording data, wherein for the purposes of preventing overwrite caused by failure to identify a sector address, realization of write protection and prevention of data from being lost due to failure to identify a sector address, a predetermined signal is overwritten in a sector address thereby making the sector address in the address part unidentifiable for securing stable data reproduction, the invention further providing an optical disc in which any address part of unstable reproduction is made unidentifiable by the above-mentioned means thereby to secure stable data reproduction.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Embodiments of the present invention will be described below with reference to the attached drawings.

Figure 1:
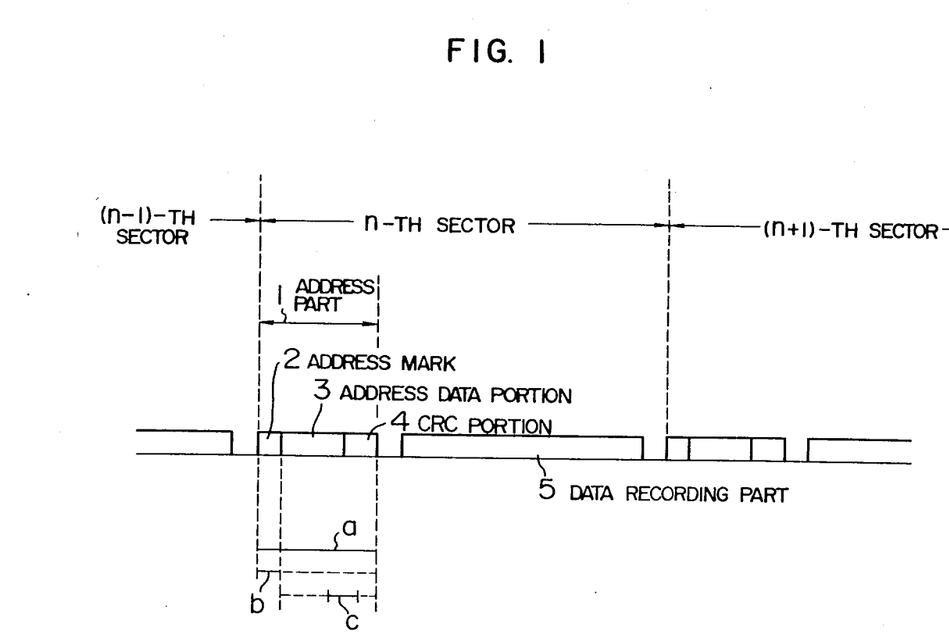
FIG. 1 is a diagram showing an example of a recording format of an optical disc used for an optical disc file device according to an embodiment of the present invention.

FIG. 1 is a diagram showing an example of the recording format of an optical disc used with an optical disc file device according to a first embodiment of the present invention.

In FIG. 1, reference numeral 1 designates an address part, numeral 2 an address mark, numeral 3 an address data portion, numeral 4 a CRC portion and numeral 5 a data recording part. Each sector includes an address part 1 and a data recording part 5. The address part 1, in turn, includes an address mark 2 indicating the beginning of the address part, an address data portion 3, and a CRC portion 4 for checking the same. If the sector address of the n-th sector is assumed to be n, the sector address n is recorded in advance by initial formatting or the like before recording and reproduction in the address part 1 of the n-th sector.

Figure 2:
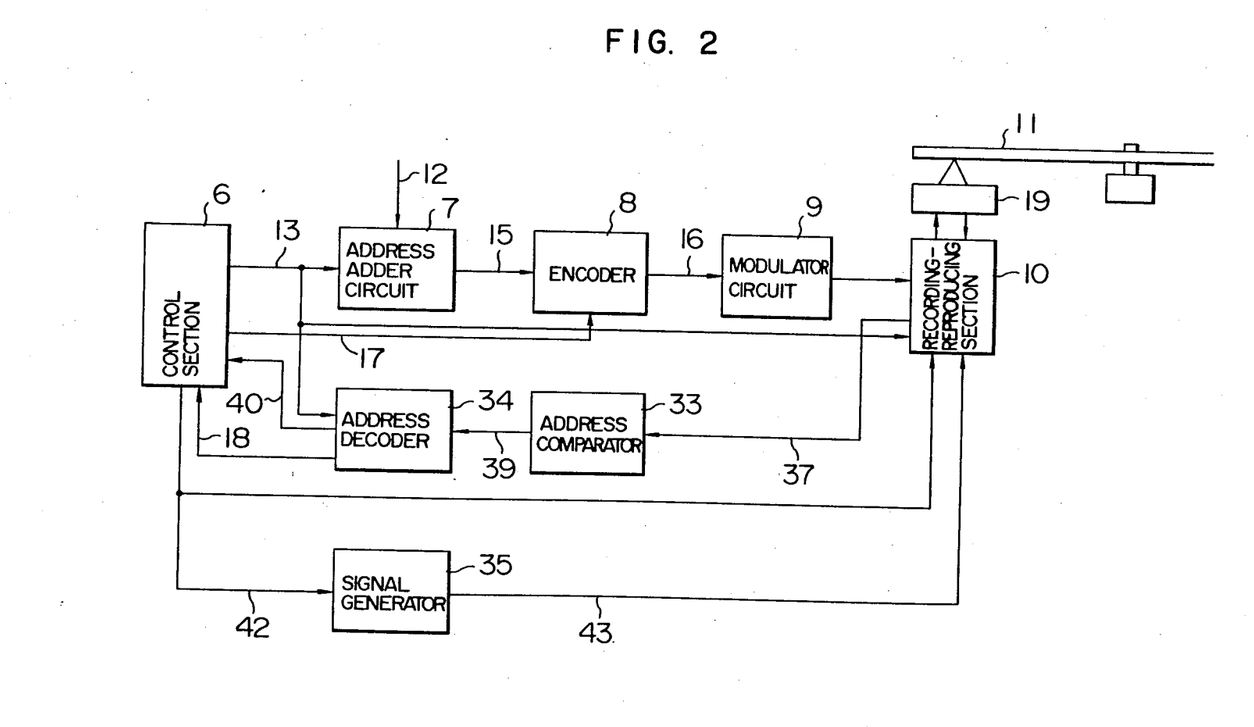
FIG. 2 is a block diagram showing a recording system of an optical file device according to a first embodiment of the present invention.
Figure 3:
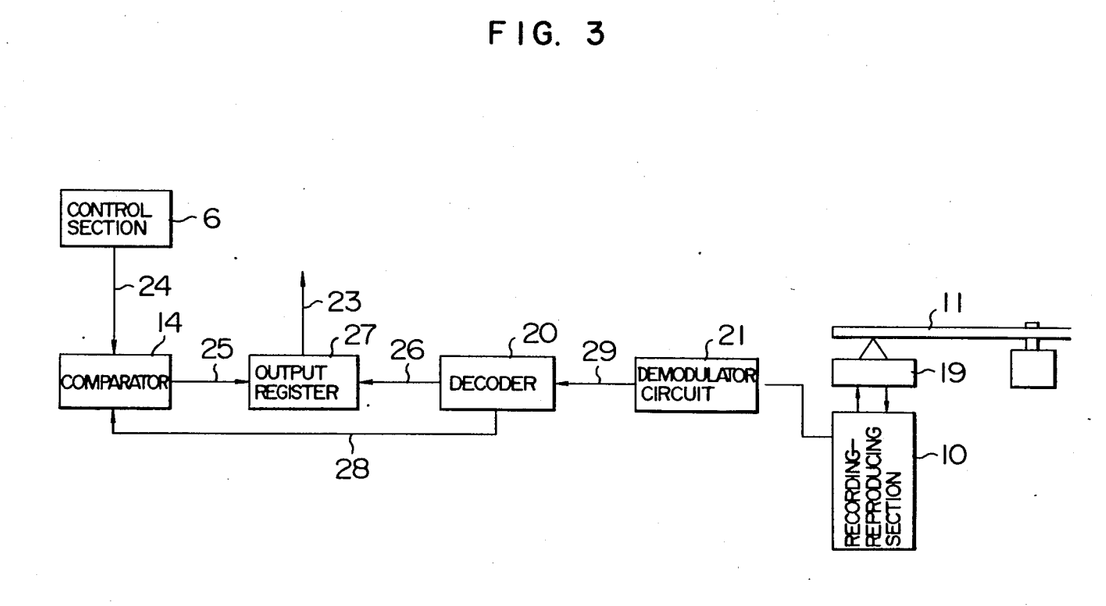
FIG. 3 is a block diagram showing a reproduction system of the same embodiment.

FIG. 2 is a block diagram showing an embodiment of the present invention for recording optical disc information having a recording format as shown in FIG. 1, and FIG. 3 a block diagram showing a device for reproducing data recorded by the recording device shown in FIG. 2.

In FIG. 2, numeral 6 designates a control section, numeral 7 an address adder circuit, numeral 8 an encoder, numeral 9 a modulator circuit, numeral 10 a recording-reproducing section, numeral 11 an optical disc, numeral 34 an address decoder, numeral 35 a signal generator. The control section 6 includes a microprocessor or the like to determine a sector address.

Assuming that a certain data 12 is intended to be recorded, the control section 6 determines a sector where the data is recordable, and applies a write address 13 making up the sector address to the address decoder 34. The control section 6 also applies the write address 13 to the address adder circuit 7 and the recording-reproducing section 10. The address adder circuit 7 adds the address 13 to the data 12 and produces a write data 15. The recording-reproducing section 10, after rough retrieval of a sector to be recorded with the write address 13, applies reproduction address signals 37 sequentially obtained from the address section 1 of the sectors near the sector to be recorded, to an address comparator 33. The address comparator 33, which binary-codes the reproduction address signal 37 and generates an address signal 39, applies it to the address decoder 34. The address decoder 34 decodes the address signal 39, and when detecting a sector involved, applies a coincidence signal 40 to the control section 6. The control section 6, upon receipt of the coincidence signal 40, applies a recording trigger signal 17 to the encoder 8. The encoder 8 performs the encoding of the write data 15 for error control. The encoded data 16 produced from the encoder 8 is modulated and recorded in the data recording part 5.

When it is desired to protect the recorded data, the control section 6 applies the address of a sector immediately preceding the relevant sector as the write address 13. The recording-reproducing section 10 supplies the address comparator 33 with the reproduction address signal 37 obtained from the address part 1 of a sector near the sector indicated by the write address 13. The address comparator 33 binary-codes the reproduction address signal, and applies the address signal 39 to the address decoder 34. The address decoder 34 applies a coincidence signal 40 to the control section 6 when the write address 13 coincides with the address obtained by decoding the address signal 39. The control section 6 which has received the coincidence signal 40, after a time delay equivalent to one sector, applies a write signal 42 to the signal generator 35 and the recording-reproducing section 10. The signal generator 35 applies a predetermined recording signal 43 to the recording-reproducing section 10. The recording-reproducing section 10 overwrites the recording signal 43 on the address part 1 of the relevant sector. As a result, the address part 1 of the particular sector is overwritten, thereby making subsequent normal reproduction impossible therefrom.

In the case where a relevant sector cannot be detected by decoding the address signal 39 by the address decoder 34, on the other hand, the address decoder 34 applies a sector non-detection signal 18 to the control section 6. The addresses of successive sectors are generally indicated by ascendant numbers, and therefore, while the recording/reproducing head reads the addresses 1 of the sectors sequentially for searching for a target sector, the address decoder produces a sector non-detection signal 18 when it fails to detect the coincidence until the result of decoding the address signal 39 exceeds the write address 13. The control section 6 judges the sector of the write address 13 associated with the received sector non-detection signal 18 as a bad sector and determines a new write address 13.

If the control section 6 designates an already-protected sector as a write address 13, the address part 1 of the particular sector is impossible to reproduce, and the write address 13 fails to coincide with the decoded address signal 39, with the result that the particular sector is judged as a bad sector and is never written for protecting the data.

In the use of an optical disc, such as disc 11, light from a semiconductor laser is irradiated on the disc for the purpose of recording and reproducing data. The recording of data is achieved by irradiating the optical disc with a relatively strong laser beam having a high recording level and which is modulated with input data. The reproduction of data is achieved by irradiating the optical disc with a relatively weak laser beam having substantially no recording level, and receiving light reflected from the disc as the result of irradiation with the weak laser beam. In making impossible the reproduction of the address part 1 of the sector by the overwriting method, the relatively strong recording laser beam is used and the address part 1 is irradiated by a D.C. signal or a given modulation signal.

There are several ways of irradiating the address part 1 of the optical disc 11, as follows:
(1) The address part 1 is entirely overwritten (length a of FIG. 1).
(2) The address mark 2 is overwritten (length b of FIG. 1).
(3) The CRC portion 4 is overwritten to produce a CRC error (length c of FIG. 1 which is shorter than that of the CRC portion 4).

In addition to the above-mentioned methods, there are various other methods of overwriting.

Now, reproduction of data from the optical disc will be explained. In FIG. 3, numeral 20 designates a decoder, numeral 21 a demodulator circuit, and numeral 27 an output register. When it is desired to read a sector and produce an output, the control section 6 reads the address of the sector and applies it to a comparator 14 as an address 24. The recording-reproducing section 10 reproduces the address part 1 of the sector for rough retrieval of a target sector. The data recording part 5 of a sector near the target sector is reproduced, and the reproduced data 29 obtained by demodulation at the demodulator circuit 21 is applied to a decoder 20. The decoder 20 decodes the reproduced data 29, and applies the decoded data 26 and the in-data address 28 to the output register 27 and the comparator 14 respectively. The comparator 14 compares the address 24 with the in-data address 28, and when they coincide with each other, produces an output trigger signal 25. The output trigger signal 25 causes the output register 27 to produce the stored decoded data 26 as an output data 23. If the read address 24 fails to coincide with the in-data address 28 in the comparator 14, by contrast, the decoded data 26 stored in the output register 27 is ignored and the reproduced data in the next sector is collected for a similar operation. In this manner, an output can be produced by the same time as completion of fine retrieval of a target sector.

In the above-mentioned optical disc file device, only the data which it is desired be protected is protected, and by the combined rough and fine retrieval of a target sector, the write protection by sector and high-speed retrieval are made possible at the same time.

Instead of the combined rough and fine retrieval as in the present embodiment, only the fine retrieval may be used for address retrieval to make all the address parts of the sectos written for prevention of overwriting impossible to reproduce.

The embodiment under consideration has features such that recording is impossible without reading an address part and that means is provided to make an address part impossible to reproduce by referring to a sector address written in the data at the time of reproduction, thus protecting the data written in the sector.

A second embodiment of the present invention will be explained.

Figure 4:
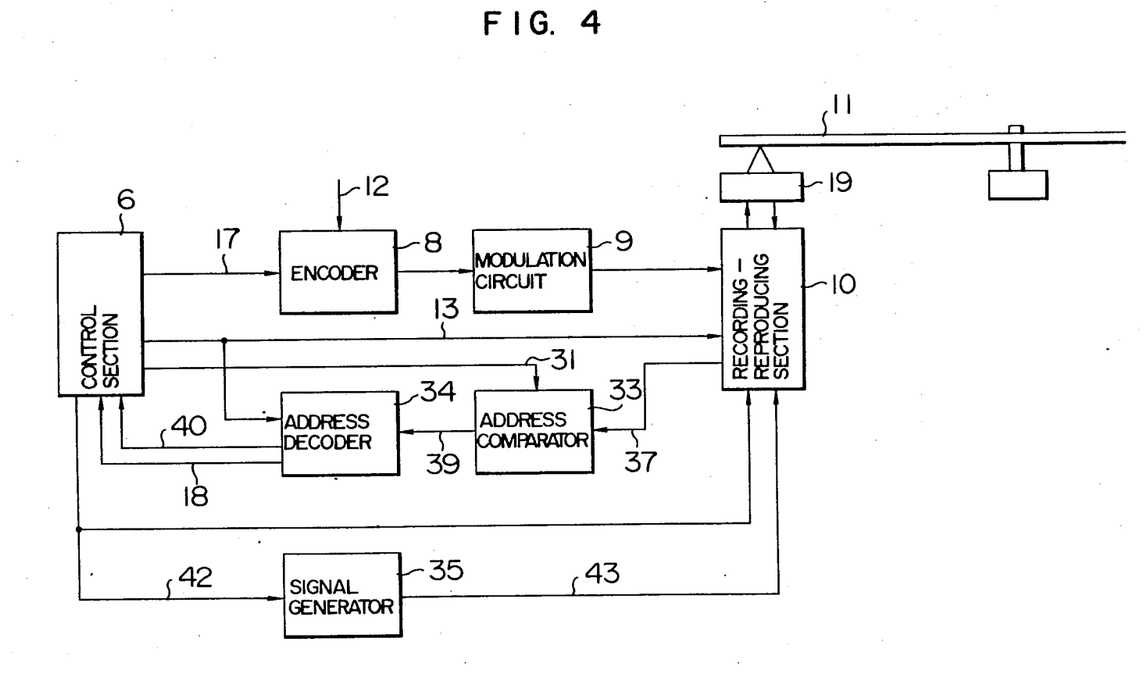
FIG. 4 is a block diagram showing a recording system of an optical disc file device according to a second embodiment of the present invention.
Figure 5:
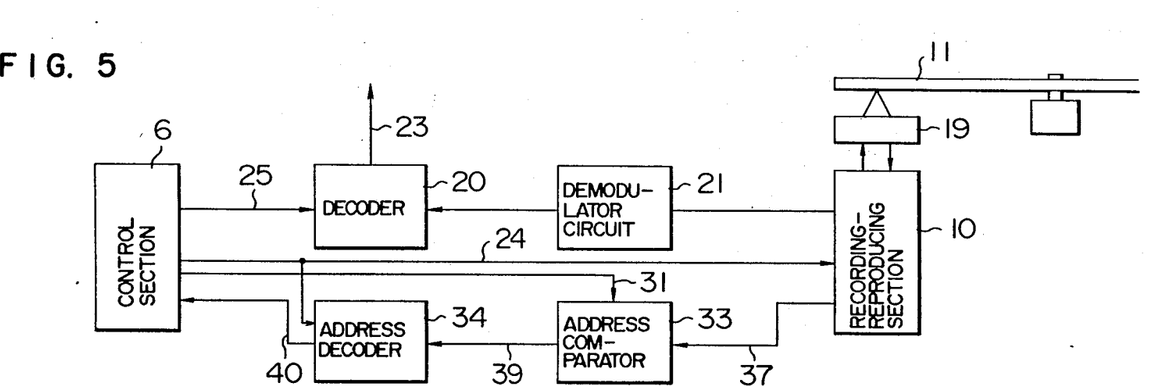
FIG. 5 is a block diagram showing a reproduction system of the same embodiment.

FIG. 4 is a block diagram showing this embodiment of an apparatus for recording data in an optical disc having a recording format as shown in FIG. 1, and FIG. 5 a block diagram of an apparatus for reproducing data recorded by an recording device as shown in FIG. 4.

In FIG. 4, numeral 6 designates a control section, numeral 8 an encoder, numeral 9 a modulator circuit, numreal 10 a recording-reproducing section, numeral 19 an optical pick-up, numeral 11 an optical disc, numeral 33 an address comparator, numeral 34 an address decoder and numeral 35 a signal generator. The control section 6 is made up of a microprocessor or the like to determine a sector address. When a data 12 is to be recorded, for example, the control section 6 determines a sector where recording is possible, and applies the write address 13 which is a sector address to the address decoder 34. The control section 6 also applies the write address 13 to the recording-reproducing section 10. The recording-reproducing section 10 controls the optical pick-up 19, and while sequentially reading the addresses 1 of the sectors, looks for a sector associated with the write address 13. The reproduced address signal 37 supplied from the recording-reproducing section 10 is binary-coded by the address comparator 33. In the process, the slice level for binary coding is set at optimum value by the control section 6, and is applied as a binary level 31 to the address comparator 33. The address signal 39 which is a signal binary-coded by the address comparator 33 is decoded by the address decoder 34 and compared with the write address 13. When both signals are found coincident with each other, a coincidence signal 40 is applied to the control section 6. If both signals fail to coincide after a relevant sector, by contrast, a sector non-detection signal 18 is produced and the control section 6 judges the sector as a bad sector and determines a new write address 13.

When a relevant sector is discovered, on the other hand, the control section 6 upon receipt of the coincidence signal 40 changes the binary level 31 and sets a slice level which is not optimum to lock again for a relevant sector. The reproduced address signal 37 supplied from the recording-reproducing section 10 is binary-coded at the binary level 31 by the address comparator 33, and applied as an address signal 39 to the address decoder 34. The address decoder 34 decodes the address signal 39 and compares it again with the write address 13, so that when both signals coincide with each other, the coincidence signal 40 is applied to the control section 6. The control section 6, upon receipt of the coincidence signal 40, applies a recording trigger signal 17 to the encoder 8. The encoder 8 encodes the data 12 for error control, which data is modulated and recorded in the data recording part 5 of the relevant sector. If coincidence is not detected after the relevant sector, on the other hand, the address decoder 34 applies a sector non-detection signal 18. The control section 6, upon receipt of the sector non-detection signal 18, again changes the binary level 31 to an optimum value, and retrieves the sector immediately preceding the relevant sector as a write address 13. Upon detection of the sector immediately preceding the relevant sector, the control section 6, after a time delay of one sector, supplies the write signal 42 to the signal generator 35 and the recording-reproducing section 10. The signal generator applies a predetermined recording signal 43 to the recording-reproducing section 10. The recording signal 43 is overwritten on the address part 1 of the relevant sector by the recording-reproducing unit 10, thereby making subsequent reproduction of the address part 1 of the relevant sector impossible.

The method by which the address part 1 of the sector is overwritten to make the address 1 impossible to reproduce is similar to the method used in the first embodiment.

Now, the reproduction will be explained. In FIG. 5, numeral 20 designates a decoder, and numeral 21 a demodulator circuit. In the case where it is desired to read and produce a specific sector, the control section reads the address of the sector and applies it as an address 24 to the recording-reproducing section 10 and the address decoder 34. The recording-reproducing section 10 supplies the address comparator 33 with the reproduced address signal 37 making up a reproduced signal of the address part 1 of a sector near the sector corresponding to the read address 24 sequentially. The address comparator 33 binary-codes the reproduced address signal 37 by the binary level 31 set at optimum, and applies it as an address signal 39 to the address decoder 34. The address decoder 34 compares the address signal 39 with the read address 24, and when they coincide with each other, applies a coincidence signal 40 to the control section 6. The control section 6 applies an output trigger signal 25 to the decoder 6. The decoder 20 decodes the reproduced data reproduced from the data recording section 5 and demodulated, and produces it as an output data 23.

As will be seen from the foregoing description, according to this embodiment, an address part is reproduced at a reduced reproduction sensitivity and compared with a sector address to be recorded in the recording mode, and if they fail to coincide with each other, that is, when a sector with an unstable address part is detected, a predetermined signal is overwritten on the address part to make the particular address part of the sector impossible to reproduce, so that it becomes impossible to record the same sector but only in a sector with a stable address part, thus making stable data reproduction possible.

Now, a third embodiment of the present invention will be described. An optical disc develops many dropouts caused by various defects including flaws as compared with a magnetic medium such as a magnetic disc, and is very high in raw error rate. In reproducing an address part formatted on the optical disc, therefore, the probability of correct reproduction is low with some address parts of unstable reproduction. Also, the reliability of the address part is not always guaranteed by the conditions of the focus or tracking servo for recording or with different optical disc recording-reproducing apparatuses.

According to the present embodiment, there is provided an optical disc guaranteeing the full reliability of an address, in which by use of the method shown in the second embodiment above, an address is reproduced from a reproduced address signal with a reduced reproduction sensitivity, and the reproduced address is compared with the address of the relevant sector, so that if they fail to coincide with each other, a predetermined signal is overwritten on the address part of the sector thereby making the particular address impossible to reproduce subsequently.

Figure 6:
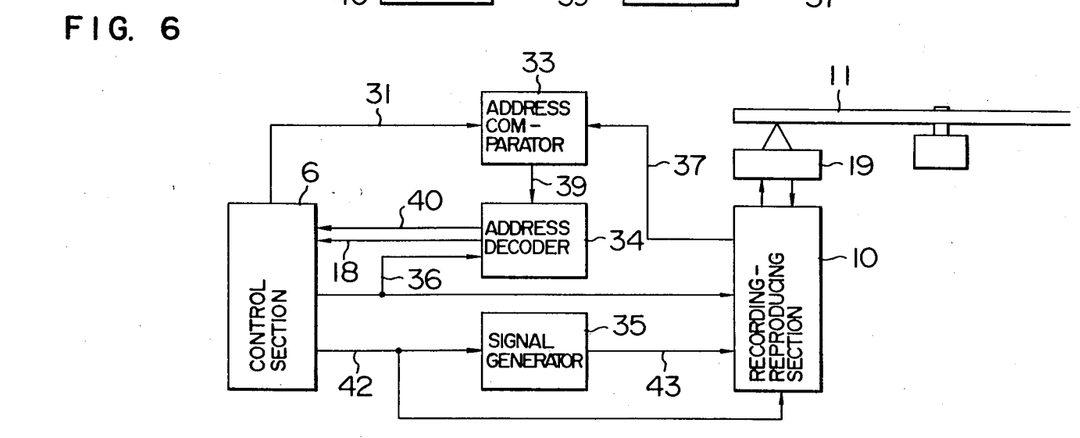
FIG. 6 is a block diagram showing an embodiment of an optical disc inspection device according to a third embodiment of the present invention.

FIG. 6 is a block diagram showing an embodiment of an apparatus for inspecting an optical disc having a recording format as shown in FIG. 1.

In FIG. 6, numeral 5 designates a control section, numeral 33 an address comparator, numeral 34 an address decoder, numeral 35 a signal generator, numeral 10 a recording-reproducing section, numeral 19 an optical pick-up, and numeral 11 an optical disc. The control section 6 includes a microprocessor or the like.

When a given sector is inspected, the control section 6 applies the sector address 36 to the recording-reproducing section 10 and the address decoder 34. The recording-reproducing section 10 controls the optical pick-up 19, reads the addresses 1 of the sectors sequentially, and searches for a sector corresponding to the sector address 36. The address comparator 33 binary-codes the reproduced address signal 37 from the recording-reproducing section 10 by a binary level 31 set to optimum value thereby producing an address signal 39. The address decoder 34 decodes the address signal 39, and upon detection of the relevant sector, applies a coincidence signal 40 to the control section 6, while when the relevant sector fails to be detected, a sector non-detection signal 18 is applied to the control section 6. Upon detection of the relevant sector, the control section 6 reduces the reproduction sensitivity by changing the binary level 31 for retrieval of a relevant sector again. The reproduced address 39 binary-coded with a reproduced reproduction sensitivity is applied to the address decoder 34, compared with the sector address 36, and if they are found coincident with each other, the address decoder 34 applies a coincidence signal 40 to the control section 6 to end the inspection concluding that the address part 1 of the relevant sector is fully reliable. If coincidence with the relevant sector address 36 is not detected, by contrast, the address decoder 34 applies a sector non-detection signal 18 the control section 6. The control section 6 changes the binary level signal 31 to an optimum value, detects the sector immediately preceding the relevant sector, and after a time delay of one sector, applies the write signal 42 to the signal generator 35 and the recording-reproducing section 10. The signal generator 35 applies a predetermined recording signal 43 to the recording-reproducing section 10, which in turn overwrites the address part 1 of the relevant sector to make it impossible to reproduce, thus terminating the inspection of the relevant sector.

According to the present embodiment, once the address parts of all of the sectors are inspected by an optical disc inspection device, an optical disc having only stable address parts can be provided.

It will be understood from the foregoing description that according to the present invention, there is provided an optical information recording and reproducing apparatus comprising means including a recording medium divided into sectors having a formatted sector address part and a data recording part for adding to data the address of the sector where the data is to be recorded and encoding the data in the recording mode and means for overwriting a predetermined signal on the address part of the sector thereby making it impossible to reproduce the address, thus preventing the data from being recorded again by error in a sector requiring protection.

Further, according to the present invention, there in provided a similar apparatus comprising means for changing the binary level in detecting a sector address thereby to detect a sector of unstable address reproduction, and means for overwriting a predetermined signal on the address part of a sector of unstable address reproduction thereby making the particular address impossible to reproduce, whereby it becomes possible to record data only in a sector of stable address reproduction thereby permitting stable data reproduction.

Furthermore, according to the present invention, there is provided an optical disc comprising sectors of stable address reproduction alone by changing the binary level of address detection thereby detecting a sector of unstable address reproduction and by overwriting a predetermined signal on the address part of this sector thereby making the address impossible to reproduce, wherein the reliability of the address parts is not affected with different optical disc recording-reproducing apparatuses or according to the conditions of focus or a tracking servo, thereby improving the interchangeability of the optical disc recording-reproducing apparatus and permitting stable information recording and reproduction.

What is claimed is:

1. An information recording and reproducing apparatus comprising means including a recording medium having an information recording region divided into a plurality of sectors each having an address part recorded with an address signal and a data recording part to be recorded with data, and means for overwriting a predetermined signal in the address part of a sector thereby making the reproduction of the sector address of the address part impossible.

2. An information recording and reproducing apparatus according to claim 1, wherein the address part of each sector includes an address mark indicating the beginning of the address data, an address data portion indicating the address of the sector, and a CRC portion making up a check signal, said apparatus further comprising overwriting means wherein a predetermined signal not longer than the CRC portion is overwritten on a selected one of the sector address portion and the CRC portion so that a CRC error may be caused in subsequent reproduction therefrom, whereby reproduction of the sector address of the address part is made impossible.

3. An information recording and reproducing apparatus according to claim 2, wherein said recording-reproducing means includes means for adding to data to be recorded and encoding the address of the sector where the data is to be recorded in the recording mode, and means for designating the address recorded in the data as a sector address wherefrom the data is to be reproduced in the reproduction mode, wherein a predetermined signal is overwritten by said overwriting means in the address part of the sector the recorded data of which is required to be protected.

4. An information recording and reproducing apparatus according to claim 2, further comprising means for changing the binary level in detecting an address from a reproduced address signal, wherein the level is changed by said level change means to detect an address from the reproduced address signal with a reduced reproduction sensitivity in the recording mode, and the address thus detected is compared with an address to be recorded so that when said addresses fail to coincide with each other, a predetermined signal is overwritten in the address part thereby making subsequent reproduction of the particular address part impossible.

5. An optical disc comprising an information recording region divided into a plurality of sectors each including an address part recorded with an address signal and a data recording part to be recorded with data, wherein the binary level in reproducing the address from a reproduced address signal obtained by reproduction of the address part is changed and the reproduced address is compared with the sector address of a relevant sector, so that when said addresses fail to coincide with each other, a predetermined signal is overwritten on the address part, whereby subsequent reproduction of the particular address part is made impossible.

6. An optical disc according to claim 5, wherein the address part of a sector includes an address mark portion indicating the beginning of the address data and a CRC portion making up a check signal therefor, wherein a predetermined signal not longer than the CRC portion is overwritten on a selected one of the sector address portion and the CRC portion, so that a CRC error may be caused by subsequent reproduction, whereby subsequent reproduction of the particular address part is made impossible.

* * * * *